June 3, 1952 B. L. LEDERMANN 2,599,062

TELEPHONE BASE ACCESSORY HOLDER

Filed Dec. 18, 1947

INVENTOR.
BILL L. LEDERMANN
BY
Martin P. Smith
ATTORNEY.

Patented June 3, 1952 2,599,062

UNITED STATES PATENT OFFICE 2,599,062

TELEPHONE BASE ACCESSORY HOLDER

Bill L. Ledermann, Beverly Hills, Calif.

Application December 18, 1947, Serial No. 792,578

1 Claim. (Cl. 211—86)

My invention relates to an accessory holder adapted to be removably applied to the conventional bases utilized for supporting telephone hand pieces, and the principal object of my invention is, to provide a simple, practically one-piece structure which may be easily and quickly applied to or removed from a telephone base, either square or round, and which structure provides a convenient holder for a pad of scratch paper, a pencil and cups or holders for cigarettes, matches and the like.

A further object of my invention is, to provide an accessory holder of the character referred to which occupies comparatively little space on the sides of the telephone base and which presents a neat and pleasing appearance.

With the foregoing and other objects in view, my invention consists in certain novel features of construction and arrangement of parts which will be hereinafter more fully described and claimed and illustrated in the accompanying drawings, in which:

Figures 1, 2:
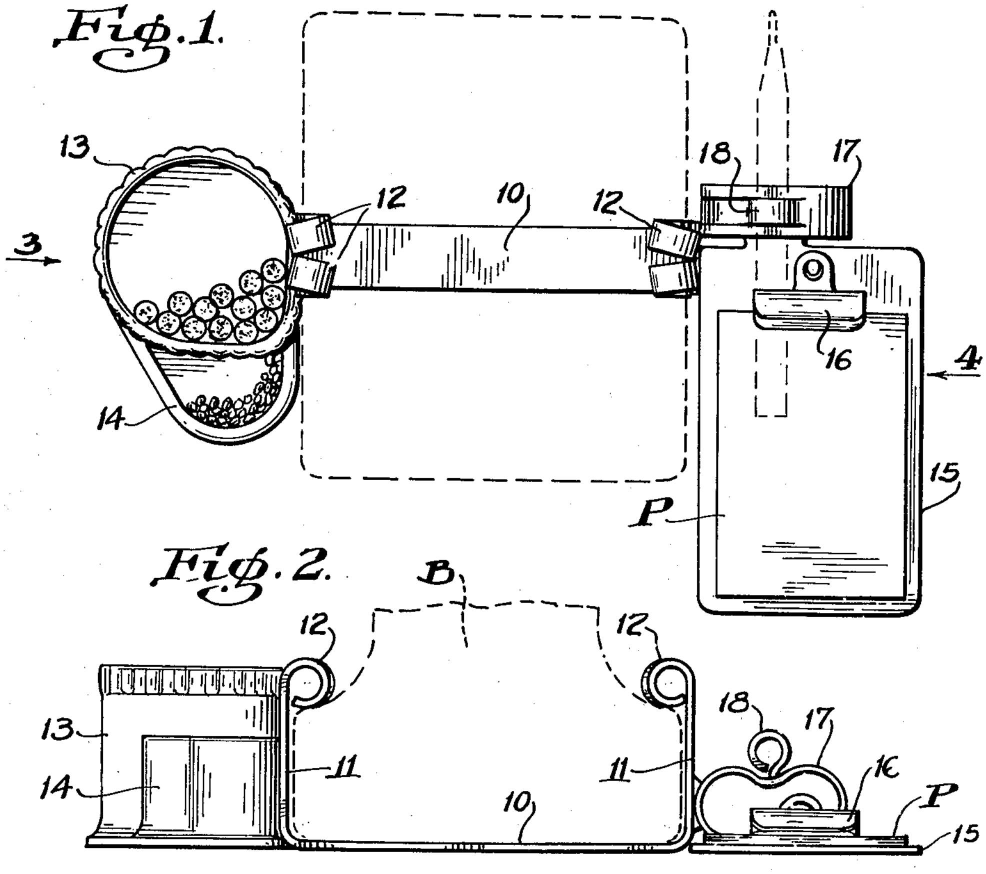
Fig. 1 is a plan view of my improved telephone base accessory holder.
Fig. 2 is a front elevation of the accessory holder.
Figure 3:
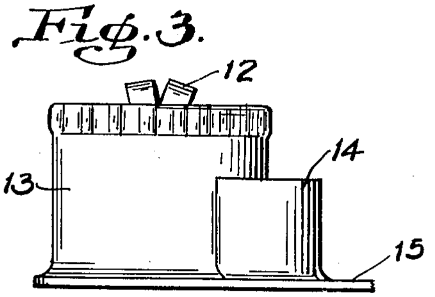
Figs. 3 and 4 are end elevational views.
Figure 4:
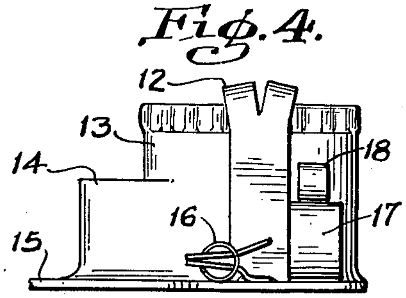

Referring by numerals to the accompanying drawing, which illustrates a preferred embodiment of my invention, 10 designates a band of thin metal or plastics, having upstanding ends 11, which readily flex toward and away from each other, when the device is applied to a telephone base B.

The upper ends of members 11 terminate in inwardly presented coils 12, adapted to fit over shoulders formed on the sides of base B, thus firmly holding the accessory in proper position thereupon.

Secured to one of the upright members 11, preferably the right hand one is an upstanding cup 13, of metal, plastics or the like, adapted to serve as a container for cigarettes and secured to the front side of said cup is a smaller cup 14 adapted to receive matches.

Secured to the opposite and/or right hand end of strap 10, is the rear end of a forwardly projecting plate 15 which serves as a writing panel and mounted on the rear end of said plate is a spring clip 16 adapted to receive and retain on said panel, a pad of scratch paper P.

Secured to plate 15 rearwardly from clip 16 is an upstanding frame 17, on top of which is mounted a loop or clip 18, adapted to receive and hold a pencil or fountain pen.

Thus, when the device is applied to the telephone base as shown in Figs. 1 and 2, the cigarette and match containers are conveniently disposed on one side of said base, with the writing panel, scratch pad and pencil holder on the other side of said base.

Figure 5:
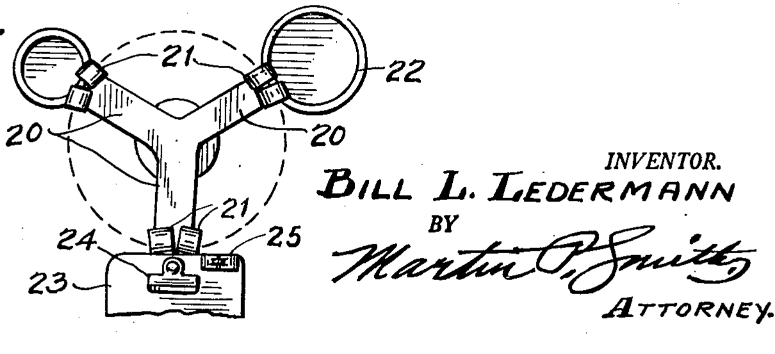
Fig. 5 is a plan view of a modified form of the accessory holder.

In Fig. 5, I have shown an accessory holder adapted to be applied to telephone bases which are circular in shape and such holder comprises a resilient base having these radial arms 20 disposed 120 degrees apart, each arm having a base engaging coil 21, with a cigarette receiving cup 22 on one arm, a match receptacle 22 on another arm and the third arm carrying a writing panel 23, a pad clip 24 and pencil clip 25.

Obviously the resilient base of the holder may be shaped so as to be readily associated with telephone bases having shapes other than round or square.

Thus it will be seen that I have provided a telephone base accessory holder which is simple in structure, inexpensive of manufacture and very effective in performing the functions for which it is intended.

Minor changes in the size, form and construction of the various parts of my improved telephone base accessory holder, may be made and substituted for those herein shown and described without departing from the spirit of the invention, the scope of which is set forth in the appended claim.

I claim as my invention:

In a telephone base accessory holder, a resilient strap adapted to occupy a transverse position beneath a telephone base, resilient members projecting upwardly from the ends of said strap, the upper end of said resilient members being split vertically and the split portions bent inwardly to provide inwardly presented coils for engagement over shoulders on the telephone base adapted to be seated on said strap and a pair of cups secured on the outer face of one of said upwardly projecting resilient members.

BILL L. LEDERMANN.

REFERENCES CITED

The following references are of record in the file of this patent:

UNITED STATES PATENTS

| Number | Name | Date |
|---|---|---|
| D. 127,353 | Marks | May 20, 1941 |
| 1,303,305 | Haymond | May 13, 1919 |
| 1,908,840 | Griest et al. | May 16, 1933 |
| 2,260,774 | Dorsett | Oct. 28, 1941 |
| 2,490,702 | Ognibene | Dec. 6, 1949 |